US009781198B2

(12) United States Patent
Lin et al.

(10) Patent No.: US 9,781,198 B2
(45) Date of Patent: Oct. 3, 2017

(54) INFORMATION PROCESSING METHOD AND ELECTRONIC DEVICE

(71) Applicant: Lenovo (Beijing) Co., Ltd., Beijng (CN)

(72) Inventors: Xiang Lin, Beijing (CN); Rongbin Xiao, Beijing (CN); Jianfeng Hu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 183 days.

(21) Appl. No.: 14/554,732

(22) Filed: Nov. 26, 2014

(65) Prior Publication Data

US 2015/0350312 A1  Dec. 3, 2015

(30) Foreign Application Priority Data

Jun. 3, 2014  (CN) .......................... 2014 1 0242060

(51) Int. Cl.
  H04L 29/08  (2006.01)
(52) U.S. Cl.
  CPC ............ *H04L 67/104* (2013.01); *H04L 67/32* (2013.01)
(58) Field of Classification Search
  CPC .............................. H04L 67/104; H04L 67/32
  See application file for complete search history.

(56) References Cited

U.S. PATENT DOCUMENTS

| 9,058,096 | B2 * | 6/2015 | Kasten | G06F 3/0484 |
| 2008/0139116 | A1 * | 6/2008 | Balgard | G08C 17/02 |
| | | | | 455/41.2 |
| 2011/0029988 | A1 * | 2/2011 | Mittal | G06F 9/54 |
| | | | | 719/314 |
| 2011/0167383 | A1 * | 7/2011 | Schuller | G06F 9/4443 |
| | | | | 715/808 |
| 2012/0185597 | A1 * | 7/2012 | Luna | H04W 4/18 |
| | | | | 709/225 |
| 2014/0019873 | A1 * | 1/2014 | Gupta | H04L 67/36 |
| | | | | 715/744 |
| 2014/0104141 | A1 * | 4/2014 | Hwang | G06F 3/1423 |
| | | | | 345/2.3 |
| 2014/0304280 | A1 * | 10/2014 | Oursbourn | G06F 17/30867 |
| | | | | 707/754 |

(Continued)

*Primary Examiner* — Abdullahi E Salad
(74) *Attorney, Agent, or Firm* — Harness, Dickey & Pierce, P.L.C.

(57) ABSTRACT

An information processing method applied to a first electronic device is provided. The first electronic device is capable of running multiple applications including a first application, and is capable of establishing a connection with and transmitting data to a second electronic device by using the first application. The method includes: when the first application runs in foreground and one or more applications including the second application run in background, receiving a first predetermined operation performed on the first application by a user; in response to the first predetermined operation, controlling a display unit of the first electronic device to display a first interface of the second application; receiving a second predetermined operation performed on the first interface by the user; and in response to the second predetermined operation, determining first data which will be transmitted to the second electronic device. A corresponding first electronic device is further provided.

7 Claims, 1 Drawing Sheet

(56) References Cited

U.S. PATENT DOCUMENTS

2014/0304715 A1\* 10/2014 Park .................. G06F 9/542
　　　　　　　　　　　　　　　　　　719/318
2015/0199122 A1\* 7/2015 Garmark ............. H04L 67/42
　　　　　　　　　　　　　　　　　　715/716

\* cited by examiner

INFORMATION PROCESSING METHOD AND ELECTRONIC DEVICE

CROSS REFERENCE TO RELATED APPLICATIONS

This application claims priority to Chinese Patent Application No. 201410242060.4, entitled "INFORMATION PROCESSING METHOD AND ELECTRONIC DEVICE", filed on Jun. 3, 2014 with State Intellectual Property Office of PRC, which is incorporated herein by reference in its entirety.

FIELD

The disclosure relates to the field of information processing technology, and in particular to an information processing method and an electronic device.

BACKGROUND

In today's information era, data sharing becomes a common requirement among people. With popularization of mobile terminal devices, people may connect one or more mobile terminal devices together to implement data sharing anywhere and anytime.

In conventional technology, people often use one or more applications on a first electronic device to download data, and when people want to use the first electronic device to share the downloaded data with a second electronic device, a connection is established between the first electronic device and the second electronic device and then data to be shared with the second electronic device is selected on the first electronic device, so as to implement data sharing.

During implementation of technical solutions according to embodiments of the disclosure, the applicant finds that the foregoing technology has at least following drawbacks.

In the conventional technology, since people use one or more applications on the first electronic device to download a large amount of data with same or different types, when selecting on the first electronic device the data needing to be shared, the selecting has to be performed on a file management interface on a basis of level by level. For a storage unit of the first electronic device, data may be hierarchically stored. Generally speaking, a level of files, which may be seen once the storage unit is opened, may be called as a first level, and a level of files, which may be seen only if a file in the first level is opened, may be called as a second level, and so on. Therefore, selecting performed level by level is needed to determine the data needing to be shared with the second electronic device, thus operation is complex and tedious.

Hence, the conventional technology encounters the problem that when selecting the data needing to be shared on the first electronic device, selecting has to be performed level by level on the file management interface, thus operation is complex and tedious.

SUMMARY

In view of a conventional technical problem that when selecting data needing to be shared on the first electronic device, selecting has to be performed level by level on a file management interface and thus operation is complex and tedious, an information processing method and a first electronic device are provided according to embodiments of the disclosure, whereby the data needing to be shared is directly selected on an interface of an application on the first electronic device, therefore the data needing to be shared may be located quickly and the efficiency for selecting the data needing to be shared is improved.

In one aspect, the information processing method is provided according to an embodiment of the disclosure. The method is applied to a first electronic device, the first electronic device is capable of running multiple applications including a first application, and is capable of establishing a connection with and transmitting data to a second electronic device by using the first application. The method includes:

when the first application runs in the foreground, and one or more applications including a second application run in the background, receiving a first predetermined operation performed on the first application by a user;

in response to the first predetermined operation, controlling a display unit of the first electronic device to display a first interface of the second application;

receiving a second predetermined operation performed on the first interface by the user; and in response to the second predetermined operation, determining first data which will be transmitted to the second electronic device.

Optionally, in response to the first predetermined operation, controlling a display unit of the first electronic device to display a first interface of the second application includes:

in response to the first predetermined operation, determining whether the connection with the second electronic device is able to be established, and acquiring a determining result; and if the determining result indicates that the connection with the second electronic device is able to be established, controlling the display unit of the first electronic device to display the first interface of the second application.

Optionally, after the step of in response to the first predetermined operation, determining whether the connection with the second electronic device is able to be established, and acquiring a determining result, the method further includes:

if the determining result indicates that the connection with the second electrical device is not able to be established, controlling the display unit of the first electronic device to display notification information to notify the user that data is not able to be transmitted.

Optionally, in response to the second predetermined operation, determining first data which will be transmitted to the second electronic device includes:

in response to the second predetermined operation, determining at least one file, running on the second application, as the first data.

Optionally, when the first application runs in the foreground, and one or more applications including a second application run in the background, receiving a first predetermined operation performed on the first application by a user includes:

if the display unit of the first electronic device displays a first application interface of the first application, and the one or more applications including the second application are in a started state, receiving the first predetermined operation performed on the first application interface by the user.

In another aspect, a first electronic device is provided according to an embodiment of the disclosure, and the first electronic device is capable of running multiple applications including a first application, and is capable of establishing a connection with and transmitting data to a second electronic device by using the first application. The first electronic device includes:

a first receiving unit, configured to, when the first application runs in the foreground, and one or more applications including a second application run in the background, receive a first predetermined operation performed on the first application by a user;

a control unit, configured to, in response to the first predetermined operation, control a display unit of the first electronic device to display a first interface of the second application;

a second receiving unit, configured to receive a second predetermined operation performed on the first interface by the user; and a determining unit, configured to, in response to the second predetermined operation, determine first data which will be transmitted to the second electronic device.

Optionally, the control unit includes:

a determining subunit, configured to, in response to the first predetermined operation, determine whether the connection with the second electronic device is able to be established, and acquire a determining result; and a control subunit, configured to, if the determining result indicates that the connection with the second electronic device is able to be established, control the display unit of the first electronic device to display the first interface of the second application.

Optionally, the control subunit is further configured to:

if the determining result indicates that the connection with the second electrical device is not able to be established, control the display unit of the first electronic device to display notification information to notify the user that data is not able to be transmitted.

Optionally, the determining unit is configured to:

in response to the second predetermined operation, determine at least one file running on the second application to be the first data.

Optionally, the first receiving unit is configured to:

if the display unit of the first electronic device displays a first application interface of the first application, and one or more applications comprising the second application are in a started state, receive the first predetermined operation performed on the first application interface by the user.

BRIEF DESCRIPTION OF THE DRAWINGS

To describe the technical solutions for the embodiments of the present disclosure or technical solutions in conventional technology more clearly, drawings used in description of the embodiments or the conventional technology are described below briefly. Apparently, the drawings described below are merely embodiments of the disclosure, and those of ordinary skills in the art can derive other drawings according to the drawings without any creative effort.

DESCRIPTION

Figure 1:
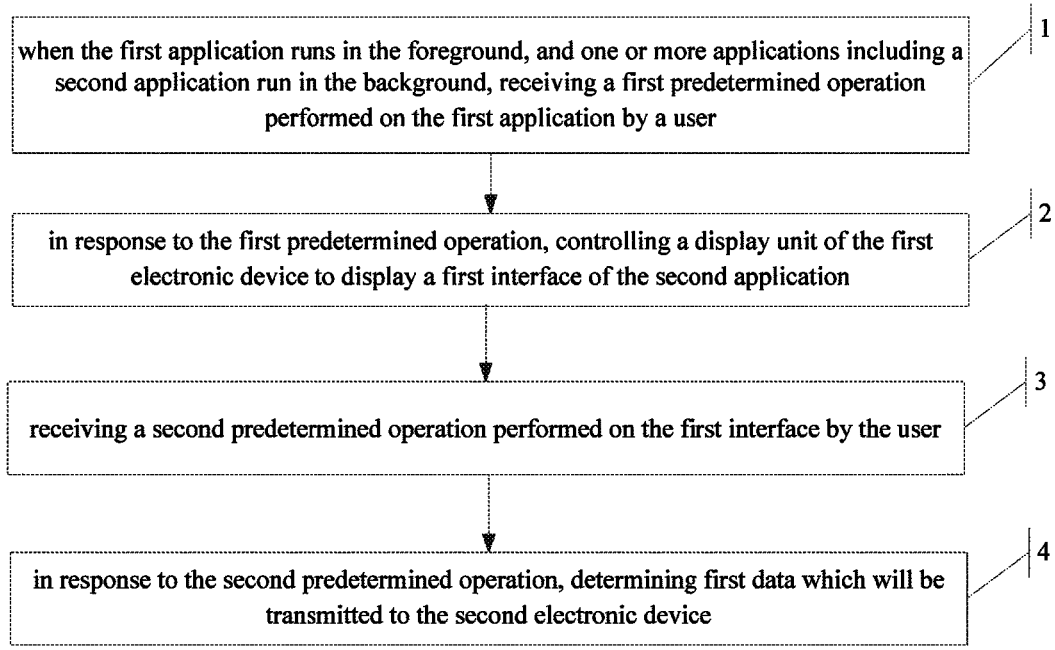
FIG. 1 is a flow chart of an information processing method according to a first embodiment of the disclosure.

To make the purpose, technical solutions and merits of the disclosure clearer and understandable, the technical solutions according to embodiments of the disclosure are clearly and completely described in the following in conjunction with drawings. Apparently, the described embodiments are merely a few rather than all of the embodiments of the present disclosure. All other embodiments obtained by persons of ordinary skill in the art are based on the embodiments of the present disclosure without creative efforts shall fall within the protection scope of the present disclosure. In case of no conflict, the embodiments and features according to the embodiments of the disclosure may be arbitrarily combined with each other. Steps shown in the flow charts of the drawings may be executed in a computer system with a series of computer executable instructions. Though logical sequences are shown in the flow charts, in some cases, the shown or described steps may be executed in sequences different from the logical sequences herein.

With an information processing method and a first electronic device provided according to the embodiments of the disclosure, a conventional technical problem that when selecting data needing to be shared on the first electronic device, selecting has to be performed level by level on a file management interface and thus operation is complex and tedious, is solved, the data needing to be shared is directly selected on an interface of an application on the first electronic device, the data needing to be shared may be quickly located, and the efficiency for selecting the data needing to be shared is improved.

For solving the foregoing technical problem, the overall idea of the technical solutions according to the embodiments of the disclosure is as follows.

An information processing method is provided. The method is applied to a first electronic device, the first electronic device is capable of running multiple applications including a first application, and the first electronic device is capable of establishing a connection with and transmitting data to a second electronic device by using the first application. The method includes: when the first application runs in the foreground, and one or more applications including a second application run in the background, receiving a first predetermined operation performed on the first application by a user; in response to the first predetermined operation, controlling a display unit of the first electronic device to display a first interface of the second application; receiving a second predetermined operation performed on the first interface by the user; in response to the second predetermined operation, determining first data which will be transmitted to the second electronic device.

The first data which will be transmitted to the second electronic device is determined according to the second predetermined operation performed by the user on the first interface of the second application running on the first electronic device. Compared with the conventional technology in which the data needing to be shared is selected level by level on a file management interface of the first electronic device, in the information processing method provided according to the embodiment of the disclosure, the data needing to be shared is directly selected on an interface of an application on the first electronic device, therefore the data needing to be shared may be located quickly and the efficiency for selecting the data needing to be shared is improved.

To better understand above technical solutions, the technical solutions are described in detail in the following in conjunction with drawings and embodiments. It is should be understood that the features described in the disclosure and the embodiments are set forth for the purpose of illustrating the technical solutions and are not meant to limit the disclosure. Unless there is a conflict, otherwise the embodiments and the features set forth in the embodiments may be arbitrarily combined with each other.

First Embodiment

An information processing method is provided according to the embodiment of the disclosure. The method is applied to a first electronic device, where the first electronic device is capable of running multiple applications including a first application, and the first electronic device is capable of establishing a connection with and transmitting data to a second electronic device by using the first application.

According to the embodiment, the first electronic device and the second electronic device may be smart phone, laptop, tablet computer, smart television, etc., or any combination thereof. The expression that first electronic device is capable of running multiple applications including the first application means that the first electronic device provides a hardware platform for running the multiple applications including the first application, and the multiple applications including the first application may implement functions of the multiple applications on the first electronic device.

The first application may be software with data sharing function, such as AnyShare, bluetooth and Zapya, etc. When the first application runs on the first electronic device, the first electronic device may establish a connection with the second electronic device by using the first application. For example, if the first electronic device may perform data transmission via Internet, the first electronic device self-creates a wireless fidelity (Wi-Fi) hotspot by using the first application, and the second electronic device searches and joins the Wi-Fi network created by the first electronic device, so that the connection is established between the first electronic device and the second electronic device. For another example, if the first electronic device and the second electronic device are in a same environment, the connection between the first electronic device and the second electronic device may be established through sensing ambient sound by the first application. After the connection is established between the first electronic device and the second electronic device, since the first application has data sharing function, the first electronic device may transmit data to the second electronic device to implement data sharing.

As shown in FIG. 1, the information processing method provided according to the embodiment of the disclosure includes following steps.

Step 1 includes: when the first application runs in the foreground, and one or more applications including a second application run in the background, receiving a first predetermined operation performed on the first application by a user;

Step 2 includes: in response to the first predetermined operation, controlling a display unit of the first electronic device to display a first interface of the second application;

Step 3 includes: receiving a second predetermined operation performed on the first interface by the user; and Step 4 includes: in response to the second predetermined operation, determining first data which will be transmitted to the second electronic device.

According to the embodiment of the disclosure, the first application may be software with data sharing function, such as AnyShare, bluetooth, Zapya, etc. The second application may be one of various audio applications, video applications, image applications, etc., such as Youku, KuGoo, a photo album, etc. The expression that the first application runs in the foreground means that the user is operating the first application and may see the application interface of the first application at this moment. The expression that the second application runs in the background means that the second application is not closed and does not affect the user to use other applications, and the second application may be invoked quickly when needed. For example, a user is chatting by using a social application on a computer, and in this case the social application is running in the foreground; at the same time the user is listening to music by using Kugoo, but the user may not see the interface of KuGoo while KuGoo is playing music, i.e., Kugoo runs in the background.

A specific implementation of step 1 in the embodiment of the disclosure may include:

if the display unit of the first electronic device displays a first application interface of the first application and the one or more applications including the second application are in a started state, receiving the first predetermined operation performed on the first application interface by the user.

Step 1 in the embodiment of the disclosure is described in detail in the following.

Since the first application runs in the foreground and the user is operating the first application, the display unit of the first electronic device displays the first application interface of the first application; at the same time one or more applications including the second application run in the background, therefore the one or more applications including the second application are in a started state and are not closed.

The first predetermined operation in step 1 may be an operation for data sharing, such as clicking a "data sharing" button on the first application interface of the first application. Alternatively, the first predetermined operation may be an operation for establishing connection, such as clicking a "searching device" button on the first application interface of the first application. Alternatively, the first predetermined operation may be an operation set by the first application, such as shaking the first electronic device, recording sound in the environment where the first electronic device locates, etc. Alternatively, the first predetermined operation may be an operation set by the user when the first electronic device runs the first application, such as pressing a particular button, for example a volume-changing button, etc.

After step 1 is executed, i.e., after the first application of the first electronic device receives the first predetermined operation performed on the first application by the user, step 2 in the information processing method provided according to the embodiment of the disclosure is executed.

After the first application receives the first predetermined operation performed on the first application by the user, since the first predetermined operation is an operation for data sharing, the first application may respond the first predetermined operation and control the display unit of the first electronic device to display an interface showing data to be transmitted.

Specifically, the first application may detect application processes on the first electronic device to find other running applications besides the first application, and then control the display unit of the first electronic device to display an interface showing downloaded data in these applications. If there are multiple applications running on the first electronic device besides the first application, the display unit of the first electronic device is controlled to display an interface showing the downloaded data in the other applications in a descending order of usage frequency of the applications, in a chronological order of the usage of the applications, in a descending order of amount of the downloaded data, in a random order, or to display an interface showing the downloaded data in a user selected application.

For example, after the first application receives the first predetermined operation performed on the first application by the user, such as clicking a "data sharing" button on a first application interface of the first application, the first application detects that Youku, KuGoo and a photo album application are running on the first electronic device besides the first application. Subsequently, in a descending order of usage frequency, a chronological order of the usage, a descending order of amount of the downloaded data, a random order, or via selecting one of the three by the user, for example, the user selects Youku, the display unit of the first electronic device is controlled to display an interface showing the downloaded data in Youku.

After the step 2 is executed, i.e., after the display unit of the first electronic device displays the first interface of the second application, step 3 and step 4 in the information processing method provided according to the embodiment of the disclosure are executed.

Specifically, the second predetermined operation in step 3 is an operation for selecting on the first interface of the second application the data which will be transmitted. The second predetermined operation may be an operation set by the first application, such as touching and holding a menu button. After the user executes the operation set by the first application, the first application detects data running in the second application, such as a file being played or being browsed, and uses the data that is running, as the data which will be transmitted.

For example, after step 2 is executed, the display unit of the first electronic device displays the interface showing the downloaded data in Youku, and then the user executes the operation set by the first application, for example, after the user presses and holds the menu button, the first application detects that a show "MAKING PROGRESS EVERYDAY" is played on Youku, then the show "MAKING PROGRESS EVERYDAY" is taken as the data which will be transmitted.

Figure 2:
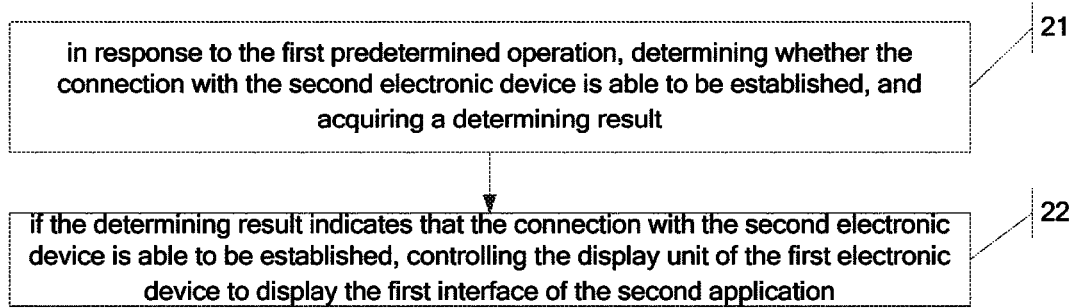
FIG. 2 is a detailed flow chart of step 2 in the information processing method according to the first embodiment of the disclosure.

As shown in FIG. 2, according to another embodiment of the disclosure, in an implementation, step 2 may include following steps.

Step 21 includes: in response to the first predetermined operation, determining whether the connection with the second electronic device is able to be established, and acquiring a determining result.

Step 22 includes: if the determining result indicates that the connection with the second electronic device is able to be established, controlling the display unit of the first electronic device to display the first interface of the second application.

Specifically, after step 1 is executed, i.e., after the first application of the first electronic device receives the first predetermined operation performed on the first application by the user, since the first predetermined operation is an operation for data sharing and whether there is an object for the data sharing should be determined before sharing data to avoid power waste of the first electronic device in the case that there is no object to be shared while the first electronic device still performs subsequent data sharing operation, the first application, in response to the first predetermined operation, determines whether the connection with the second electronic device is able to be established.

Specifically, since there are various approaches for establishing a connection between the first electronic device and the second electronic device, accordingly, there are various approaches for determining whether the connection with the second electronic device is able to be established. For example, if the first electronic device may perform data transmission by using Internet, and the first electronic device creates a Wi-Fi network, whether the second electronic device is covered by the WI-Fi network established by the first electronic device is determined. For another example, if the first electronic device and the second electronic device are in a same environment, whether the sound in the environment where the first electronic device locates is the same as the sound in the environment where the second electronic device locates is determined by sensing ambient sound through using the first application.

If the determining result indicates that the connection with the second electronic device is able to be established, the display unit of the first electronic device is controlled to display the first interface of the second application.

Specifically, the first application may detect application processes on the first electronic device to find other running applications besides the first application, so as to control the display unit of the first electronic device to display an interface showing downloaded data in these applications. If there are multiple applications running on the first electronic device besides the first application, the display unit of the first electronic device is controlled to display an interface showing the downloaded data in the other applications in a descending order of usage frequency of the applications, in a chronological order of the usage of the applications, in a descending order of amount of the downloaded data, in a random order, or to display an interface showing the downloaded data in a user selected application.

For example, after the first application receives the first predetermined operation performed on the first application by the user, such as clicking a "data sharing" button on a first application interface of the first application, the first application detects that Youku, KuGoo and a photo album application are running on the first electronic device besides the first application. Subsequently, in a descending order of usage frequency, a chronological order of the usage, a descending order of amount of the downloaded data, a random order, or via selecting one of the three by the user, for example, the user selects Youku, the display unit of the first electronic device is controlled to display an interface showing the downloaded data in Youku.

According to the embodiment, after step 21 is executed, the following step may be executed instead of step 22.

If the determining result indicates that the connection with the second electrical device is not able to be established, the display unit of the first electronic device is controlled to display notification information to notify the user that data is not able to be transmitted.

Specifically, after the first application determines, in response to the first predetermined operation, whether the connection with the second electronic device is able to be established, if the determining result indicates that the connection with the second electrical device is not able to be established, the first application controls the display unit of the first electronic device to display notification information to notify the user that data is not able to be transmitted.

Second Embodiment

Based on the same inventive concept, a first electronic device is further provided according to the embodiment of the disclosure. Since the first electronic device resolves problems in a principle similar to that of the information processing method, for the implementation of the first electronic device, one may refer to the implementation of the method, which is not repeated herein.

Figure 3:
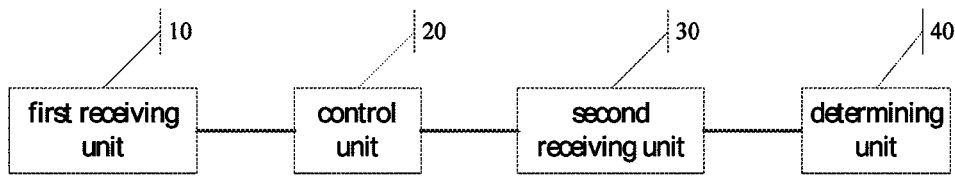
FIG. 3 is a module diagram of a first electronic device according a second embodiment of the disclosure.

As shown in FIG. 3, a first electronic device is provided according to the embodiment of the disclosure, and the first electronic device is capable of running multiple applications including a first application, and is capable of establishing a connection with and transmitting data to a second electronic device by using the first application. The first electronic device includes:

a first receiving unit 10, configured to, when the first application runs in the foreground, and one or more applications including a second application run in the background, receive a first predetermined operation performed on the first application by a user;

a control unit 20, configured to, in response to the first predetermined operation, control a display unit of the first electronic device to display a first interface of the second application;

a second receiving unit 30, configured to, receive a second predetermined operation performed on the first interface by the user; and a determining unit 40, configured to, in response to the second predetermined operation, determine first data which will be transmitted to the second electronic device.

Optionally, the control unit includes:

a determining subunit, configured to, in response to the first predetermined operation, determine whether the connection with the second electronic device is able to be established, and acquire a determining result; and a control subunit, configured to, if the determining result indicates that the connection with the second electronic device is able to be established, control the display unit of the first electronic device to display the first interface of the second application.

Optionally, the control subunit is further configured to:

if the determining result indicates that the connection with the second electrical device is not able to be established, control the display unit of the first electronic device to display notification information to notify the user that data is not able to be transmitted.

Optionally, the determining unit is further configured to:

in response to the second predetermined operation, determine at least one file running on the second application, as the first data.

Optionally, the first receiving unit is further configured to:

if the display unit of the first electronic device displays a first application interface of the first application and the one or more applications comprising the second application are in a started state, receive the first predetermined operation performed on the first application interface by the user.

One or more technical solutions provided according to the foregoing embodiments of the disclosure have at least following technical effects or advantages.

1. According to the embodiments of the disclosure, on a premise that a first electronic device is capable of running multiple applications including a first application, and the first electronic device is capable of establishing a connection with and transmitting data to a second electronic device by using the first application, when the first application runs in the foreground and one or more applications including a second application run in the background, firstly a first predetermined operation performed on the first application by a user is received, and in response to the first predetermined operation, a display unit of the first electronic device is controlled to display a first interface of the second application, then a second predetermined operation performed on the first interface by the user is received, in response to the second predetermined operation, first data which will be transmitted to the second electronic device is determined.

The first data which will be transmitted to the second electronic device is determined according to the second predetermined operation performed by the user on the first interface of the second application running on the first electronic device. Compared with the conventional technology in which the data needing to be shared is selected level by level on a file management interface of the first electronic device, in the information processing method provided according to the embodiment of the disclosure, the data needing to be shared is directly selected on an interface of an application on the first electronic device, therefore the data needing to be shared may be located quickly and the efficiency for selecting the data needing to be shared is improved.

2. According to the embodiments of the disclosure, on a premise that a first electronic device is capable of running multiple applications including a first application, and the first electronic device is capable of establishing a connection with and transmitting data to a second electronic device by using the first application, when the first application runs in the foreground and one or more applications including a second application run in the background, firstly a first predetermined operation performed on the first application by a user is received, and in response to the first predetermined operation, whether the connection with the second electronic device is able to be established is determined to acquire a determining result, and if the determining result indicates that the connection with the second electronic device is able to be established, a display unit of the first electronic device is controlled to display a first interface of the second application.

Before determining the first data which will be transmitted to the second electronic device according to the second predetermined operation performed by the user on the first interface of the second application running on the first electronic device, whether the connection with the second electronic device is able to be established is determined, and only if the first electronic device may establish the connection to the second electronic device, the first interface of the second application is displayed on the display unit of the first electronic device. In one aspect, power consumption of the first electronic device is reduced, and standby duration of the first electronic device is extended; in another aspect, the user may learn whether data may be shared through the fact whether the display unit of the first electronic device displays the first interface of the second application, thereby improving efficiency for data sharing, and improving user experience.

It should be understood by those skilled in the art that, the embodiments according to the present disclosure may be implemented as a method, system or computer program product. Hence, the embodiments of the invention may be implemented with hardware only, with software only, or with a combination of hardware and software. Furthermore, the embodiments of the present disclosure may be implemented in computer program products in the form of computer readable media (including but not limited to magnetic disk storages, optical storages, etc.) storing computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to achieve a machine, in which device(s) to implement functions specified in one or more processes of the flowchart and/or one or more blocks of the block diagram is(are) achieved through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Specifically, the information processing method according to the embodiment of the disclosure is applied to a first electronic device. The first electronic device is capable of running multiple applications including a first application, and is capable of establishing a connection with and transmitting data to a second electronic device. Computer program instructions corresponding to the method may be stored on a storage medium such as a compact disk, a hand disk and a universal serial bus (USB) disk. When the computer program instructions corresponding to the information processing method, which are stored in the storage medium, are read or executed by an electronic device, following steps are executed:

when the first application runs in the foreground and one or more applications including a second application run in the background, receiving a first predetermined operation performed on the first application by a user;

in response to the first predetermined operation, controlling a display unit of the first electronic device to display a first interface of the second application;

receiving a second predetermined operation performed on the first interface by the user; and in response to the second predetermined operation, determining first data which will be transmitted to the second electronic device.

Optionally, an execution process for the computer instructions stored in the storage medium which correspond to the process of in response to the first predetermined operation, controlling a display unit of the first electronic device to display a first interface of the second application, includes following steps:

in response to the first predetermined operation, determining whether the connection with the second electronic device is able to be established, and acquiring a determining result; and if the determining result indicates that the connection with the second electronic device is able to be established, controlling the display unit of the first electronic device to display the first interface of the second application.

Optionally, other computer instructions are also stored in the storage medium. The other computer instructions are executed after the computer instructions corresponding to the process of in response to the first predetermined operation, determining whether the connection with the second electronic device is able to be established and acquiring a determining result, are executed. The execution process of the other computer instructions includes following steps:

if the determining result indicates that the connection with the second electrical device is not able to be established, controlling the display unit of the first electronic device to display notification information to notify the user that data is not able to be transmitted.

Optionally, an execution process for the computer instructions stored in the storage medium which correspond to the process of in response to the second predetermined operation, determining first data which will be transmitted to the second electronic device, includes following steps:

in response to the second predetermined operation, determining at least one file running on the second application, as the first data.

Optionally, an execution process for the computer instructions stored in the storage medium which correspond to the process of when the first application runs in the foreground, and one or more applications including a second application run in the background, receiving a first predetermined operation performed on the first application by a user, includes following steps:

if the display unit of the first electronic device displays a first application interface of the first application, and one or more applications comprising the second application are in a started state, receiving the first predetermined operation performed on the first application interface by the user.

Preferred embodiments of the disclosure are described, and once the basic creative idea is learned, those skilled in the art may make additional alternations and modifications on these embodiments. Therefore, the appended claims intend to be explained to include all preferred embodiments and all alternations and modifications within the scope of the disclosure.

Obviously, various changes and modifications can be made to the disclosure by those skilled in the art without departing from the spirit and scope of the disclosure. The disclosure intends to cover those changes and modifications within the scope of the claims of the invention and equivalents thereof.

The invention claimed is:

1. An information processing method, applied to a first electronic device, wherein the first electronic device is capable of establishing a connection with and transmitting data to a second electronic device by using a first application, the method comprises:

when the first application runs in foreground and one or more applications run in background, receiving a first predetermined operation performed on the first application by a user;

in response to the first predetermined operation, determining one or more applications that run in the background, and identifying a second application, whose data is to be transmitted, from the one or more applications that run in the background;

controlling a display unit of the first electronic device to display a first interface of the second application;

receiving a second predetermined operation performed on the first interface by the user; and in response to the second predetermined operation, determining at least one file, running on the second application, as data to be transmitted to the second electronic device, wherein receiving the first predetermined operation performed on the first application by the user includes:
when the display unit of the first electronic device displays a first application interface of the first application and the one or more applications that run in the background are in a started state, receiving the first predetermined operation performed on the first application interface by the user.

2. The method according to claim 1, further comprising:
in response to the first predetermined operation, determining whether the connection with the second electronic device is able to be established, and acquiring a determining result.

3. The method according to claim 2, wherein after the step of in response to the first predetermined operation determining whether the connection with the second electronic device is able to be established and acquiring a determining result, the method further comprises:
if the determining result indicates that the connection with the second electrical device is not able to be established, controlling the display unit of the first electronic device to display notification information to notify the user that data is not able to be transmitted.

4. A first electronic device, which is capable of establishing a connection with and transmitting data to a second electronic device by using a first application, comprising a processor and a non-transitory storage medium having a plurality of instructions stored thereon that, when executed by the processor, cause the processor to:
when the first application runs in foreground and one or more applications run in background, receive a first predetermined operation performed on the first application by a user;
in response to the first predetermined operation, determine one or more applications that run in the background, identify a second application, whose data is to be transmitted, from the one or more applications that run in background, and control a display unit of the first electronic device to display a first interface of the second application;
receive a second predetermined operation performed on the first interface by the user;
in response to the second predetermined operation, determine at least one file, running on the second application, as data to be transmitted to the second electronic device; and
when the display unit displays a first application interface of the first application and the one or more applications are in a started state, receive the first predetermined operation performed on the first application interface by the user.

5. The first electronic device according to claim 4, wherein the instructions further cause the processor to:
in response to the first predetermined operation, determine whether the connection with the second electronic device is able to be established, and acquire a determining result.

6. The first electronic device according to claim 5, wherein the instructions further cause the processor to:
if the determining result indicates that the connection with the second electrical device is not able to be established, control the display unit to display notification information to notify the user that data is not able to be transmitted.

7. An information processing method, applied to a first electronic device, wherein the first electronic device is capable of establishing a connection with and transmitting data to a second electronic device by using a first application, the method comprising:
when the first application runs in foreground and one or more applications run in background, receiving a first predetermined operation performed on the first application by a user, wherein the first predetermined operation is an operation for sharing data between the first electronic device and the second electronic device;
in response to receiving the first predetermined operation, determining one or more applications that run in the background;
displaying, on a display unit of the first electronic device, an interface listing the one or more applications determined to run in the background, wherein the interface is operable to receive an input from the user to select an application from among the one or more applications that run in the background;
in response to receiving the input from the user, identifying the application selected from among the one or more applications that run in the background as a second application whose data is to be transmitted to the second electronic device;
displaying, on the display unit of the first electronic device, a first interface of the second application;
receiving a second predetermined operation performed on the first interface by the user, wherein the second predetermined operation is an operation set by the first application; and
in response to receiving the second predetermined operation, determining first data of the second application as data to be transmitted to the second electronic device.

* * * * *